(12) United States Patent
Kraay et al.

(10) Patent No.: US 6,202,068 B1
(45) Date of Patent: Mar. 13, 2001

(54) DATABASE DISPLAY AND SEARCH METHOD

(76) Inventors: Thomas A. Kraay, 15192 Harrison Hill La., Leesburg, VA (US) 20176-5618; Charles E. Brisbin, 13 Rutherford Cir., Sterling, VA (US) 20165-6221

( * ) Notice: Subject to any disclaimer, the term of this patent is extended or adjusted under 35 U.S.C. 154(b) by 0 days.

(21) Appl. No.: 09/109,491

(22) Filed: Jul. 2, 1998

(51) Int. Cl.$^7$ ............................................. G06K 9/00
(52) U.S. Cl. ............................ 707/102; 707/6; 707/7; 707/10; 707/101
(58) Field of Search ........................... 707/1, 100, 102, 707/200, 205, 10; 382/4, 177; 345/471; 395/139

(56) References Cited

U.S. PATENT DOCUMENTS

| | | | |
|---|---|---|---|
| 4,817,183 | * | 3/1989 | Sparrow ................................. 382/4 |
| 5,687,253 | * | 11/1997 | Huttenlocher et al. .............. 382/177 |
| 5,737,507 | * | 4/1998 | Smith .................................. 395/139 |
| 5,832,494 | * | 11/1998 | Egger et al. ............................ 707/2 |
| 5,859,648 | * | 1/1999 | Moore et al. ........................ 345/471 |
| 5,930,799 | * | 7/1999 | Tamano et al. ...................... 707/102 |

* cited by examiner

*Primary Examiner*—Thomas G. Black
*Assistant Examiner*—Thuy Do
(74) *Attorney, Agent, or Firm*—Handal & Morofsky

(57) ABSTRACT

A method for efficiently and expediently searching a database so that large quantities of data may be visualized to reveal and readily identify underlying patterns and/or obscure, latent relationships among the individual data elements, comprising: selecting a particular aspect of relationship information; scanning the data items and their associated information to determine the existence of the selected aspect of relationship information; selecting an object data item from the data items; grouping a plurality of data items related to the object data item into a specific group having a defined relationship with at least one other related data item contained within the specific group; identifying each data item contained within the same group as the object data item; tallying the magnitude associated with the selected aspect of relationship information for each data item with respect to every other data item in the database; and mapping the object data item and the other data items identified as being contained within the same group as the object data item onto a Cartesian coordinate, thus generating an image for display.

24 Claims, 13 Drawing Sheets

| CALLER | CALLEE |
|---|---|
| 555-123-0001 (22) | 555-123-0300 |
| 555-123-4000 | 555-123-0020 |
| 555-123-8899 | 555-123-5500 |
| 555-123-0808 | 555-123-0300 |
| 555-123-5500 | 555-123-4000 |
| 555-123-0300 | 555-123-4000 |
| 555-123-0777 | 555-123-0660 |
| 555-123-0020 | 555-123-0300 |
| 555-123-0001 | 555-123-4000 |
| 555-123-0300 | 555-123-5500 |
| 555-123-0808 | 555-123-4000 |
| 555-123-4000 | 555-132-0001 |
| 555-123-0020 | 555-123-5500 |
| 555-123-0808 | 555-123-8899 |
| 555-123-8899 | 555-123-0001 |
| 555-123-0808 | 555-123-4000 |
| 555-123-4000 | 555-123-0001 |
| 555-123-0020 | 555-123-5500 |
| 555-123-0808 | 555-123-8899 |
| 555-123-8899 | 555-123-0001 |

FIGURE 3

| | | |
|---|---|---|
| 1) | 555-123-0001 | 22 |
| 2) | 555-123-0020 | |
| 3) | 555-123-0300 | |
| 4) | 555-123-0660 | |
| 5) | 555-123-0777 | |
| 6) | 555-123-0808 | |
| 7) | 555-123-4000 | |
| 8) | 555-123-5500 | |
| 9) | 555-123-8899 | |

FIGURE 4

| NEW, TEMPORARY DATABASE ||
|---|---|
| 555-123-0001 | 555-123-4000 |
| 555-123-0001 | 555-123-4000 |
| 555-123-0001 | 555-123-4000 |
| 555-123-0001 | 555-123-4000 |
| 555-123-0001 | 555-123-4000 |
| 555-123-0001 | 555-123-4000 |
|  | 555-123-4000 |
| 555-123-0020 | 555-123-4000 |
| 555-123-0020 |  |
| 555-123-0020 | 555-123-5500 |
| 555-123-0020 | 555-123-5500 |
|  | 555-123-5500 |
| 555-123-0300 | 555-123-5500 |
| 555-123-0300 | 555-123-5500 |
| 555-123-0300 |  |
| 555-123-0300 | 555-123-8899 |
| 555-123-0300 | 555-123-8899 |
|  | 555-123-8899 |
| 555-123-0660 | 555-123-8899 |
|  | 555-123-8899 |
| 555-123-0777 |  |
|  |  |
| 555-123-0808 |  |
| 555-123-0808 |  |
| 555-123-0808 |  |
| 555-123-0808 |  |
| 555-123-0808 |  |
|  |  |

| Figure 5A (sort by numerical order) |
|---|
| 0001-6 |
| 0020-4 |
| 0300-5 |
| 0660-1 |
| 0777-1 |
| 0808-5 |
| 4000-8 |
| 5500-5 |
| 8899-5 |

| Figure 5B (sort by frequency) |
|---|
| 4000-8 |
| 0001-6 |
| 0300-5 |
| 0808-5 |
| 5500-5 |
| 8899-5 |
| 0020-4 |
| 0660-1 |
| 0777-1 |

FIGURE 6

| | 0001 | 0200 | 0300 | 0660 | 0777 | 0808 | 4000 | 5500 | 8899 |
|---|---|---|---|---|---|---|---|---|---|
| 0001 | 0 | 0 | 1 | 0 | 0 | 0 | 3 | 0 | 2 |
| 0200 | 0 | 0 | 1 | 0 | 0 | 0 | 1 | 2 | 0 |
| 0300 | 1 | 1 | 0 | 0 | 1 | 1 | 1 | 1 | 0 |
| 0660 | 0 | 0 | 0 | 1 | 0 | 0 | 0 | 0 | 0 |
| 0777 | 0 | 0 | 1 | 0 | 0 | 0 | 0 | 0 | 0 |
| 0808 | 0 | 1 | 1 | 0 | 0 | 0 | 2 | 1 | 2 |
| 4000 | 3 | 2 | 1 | 0 | 0 | 2 | 0 | 0 | 0 |
| 5500 | 0 | 0 | 0 | 0 | 0 | 0 | 1 | 0 | 1 |
| 8899 | 2 | 0 | 0 | 0 | 0 | 2 | 0 | 1 | 0 |
| FREQ | 6 | 4 | 5 | 1 | 1 | 5 | 8 | 5 | 5 |
| VAL | 3 | 3 | 5 | 1 | 1 | 3 | 5 | 4 | 3 |

FIGURE 7

| NUMBER | 555-123-4000 |
|---|---|
| COMMUNICATES WITH | 555-123-0020<br>555-123-5500<br>555-123-0300<br>555-123-0001<br>555-123-0808 |
| VALENCE OF | 5 |

~ 92

| NUMBER | 555-123-0001 |
|---|---|
| COMMUNICATES WITH | 555-123-0300<br>555-123-4000<br>555-123-8899 |
| VALENCE OF | 3 |

| NUMBER | 555-123-0300 |
|---|---|
| COMMUNICATES WITH | 555-123-0001<br>555-123-4000<br>555-123-0020<br>555-123-5500<br>555-123-0808 |
| VALENCE OF | 5 |

| NUMBER | 555-123-8899 |
|---|---|
| COMMUNICATES WITH | 555-123-5500<br>555-123-0808<br>555-123-0001 |
| VALENCE OF | 3 |

| NUMBER | 555-123-0808 |
|---|---|
| COMMUNICATES WITH | 555-123-0300<br>555-123-4000<br>555-123-8899 |
| VALENCE OF | 3 |

| NUMBER | 555-123-5500 |
|---|---|
| COMMUNICATES WITH | 555-123-0020<br>555-123-8899<br>555-123-0300<br>555-123-4000 |
| VALENCE OF | 4 |

| NUMBER | 555-123-0020 |
|---|---|
| COMMUNICATES WITH | 555-123-4000<br>555-123-5500<br>555-123-0300 |
| VALENCE OF | 5 |

| NUMBER | 555-123-0660 |
|---|---|
| COMMUNICATES WITH | 555-123-0770 |
| VALENCE OF | 1 |

| NUMBER | 555-123-0770 |
|---|---|
| COMMUNICATES WITH | 555-123-0660 |
| VALENCE OF | 1 |

|      | 0001 | 0200 | 0300 | 0808 | 4000 | 5500 | 8899 | 0660 | 0777 |
|------|------|------|------|------|------|------|------|------|------|
| 0001 | 0    | 0    | 1    | 0    | 3    | 0    | 2    | 0    | 0    |
| 0200 | 0    | 0    | 1    | 0    | 1    | 2    | 0    | 0    | 0    |
| 0300 | 1    | 1    | 0    | 1    | 1    | 1    | 0    | 0    | 0    |
| 0808 | 0    | 0    | 1    | 0    | 2    | 0    | 2    | 0    | 0    |
| 4000 | 3    | 1    | 1    | 2    | 0    | 1    | 0    | 0    | 0    |
| 5500 | 0    | 2    | 1    | 0    | 1    | 0    | 1    | 0    | 0    |
| 8899 | 2    | 0    | 0    | 2    | 0    | 1    | 0    | 0    | 0    |
| 0660 | 0    | 0    | 0    | 0    | 0    | 0    | 0    | 0    | 1    |
| 0777 | 0    | 0    | 0    | 0    | 0    | 0    | 0    | 1    | 0    |
| FREQ | 6    | 4    | 5    | 5    | 8    | 5    | 5    | 1    | 1    |
| VAL  | 3    | 3    | 5    | 3    | 5    | 4    | 3    | 1    | 1    |

FIGURE 9

|      | 0001 | 0200 | 0300 | 0808 | 4000 | 5500 | 8899 | 660 | 777 |
|------|------|------|------|------|------|------|------|-----|-----|
| 0001 | 0.0  | 10.0 | 3.0  | 10.0 | 1.0  | 10.0 | 1.5  | 0.0 | 0.0 |
| 0200 | 10.0 | 0.0  | 3.0  | 10.0 | 3.0  | 1.5  | 10.0 | 0.0 | 0.0 |
| 0300 | 3.0  | 3.0  | 0.0  | 3.0  | 3.0  | 3.0  | 10.0 | 0.0 | 0.0 |
| 0808 | 10.0 | 10.0 | 3.0  | 0.0  | 1.5  | 10.0 | 1.5  | 0.0 | 0.0 |
| 4000 | 1.0  | 3.0  | 3.0  | 1.5  | 0.0  | 3.0  | 10.0 | 0.0 | 0.0 |
| 5500 | 10.0 | 1.5  | 3.0  | 10.0 | 3.0  | 0.0  | 3.0  | 0.0 | 0.0 |
| 8899 | 1.5  | 10.0 | 10.0 | 1.5  | 10.0 | 3.0  | 0.0  | 0.0 | 0.0 |
| 0660 | 0.0  | 0.0  | 0.0  | 0.0  | 0.0  | 0.0  | 0.0  | 0.0 | 1.0 |
| 0777 | 0.0  | 0.0  | 0.0  | 0.0  | 0.0  | 0.0  | 0.0  | 1.0 | 0.0 |

DATABASE DISPLAY AND SEARCH METHOD

TECHNICAL FIELD

The present invention relates to the field of computerized database search and display methods. Specifically, the present invention provides a method for searching data, and graphically displaying the search results on a computer monitor.

BACKGROUND

In the past, much effort has been devoted to developing efficient methods of performing computerized research. Recent efforts in this area have been aimed at reducing the time required to accomplish an efficient search, while still providing accurate results. These efforts, however have fallen short of expectations due to the complicated and time consuming calculations required.

In general database searching has been limited to a "boolean" search, whereby the user inputs a specific data or textual item and the search program performs a text by text analysis procedure. Only direct textual matches are retrieved for the user to evaluate. Not only is this type of search inefficient, but large amounts of irrelevant data may also be retrieved due to the nature of the search.

To solve this and other problems associated with a boolean type search, computerized search programs have evolved to search a database for relationships among the data. Once these relationships are identified, they can be quantified as Euclidean distances and output to a display, whereby the distance between the data points represents the magnitude of the relationship between all data points. However, the number of Euclidean distances usually far exceeds the number of degrees of freedom available for mapping the data points into the x-y plane. Therefore, in order to map the data elements to the x-y plane while preserving the Euclidean distances as much as possible, a least squares approach to mapping the points is used. When a large database consisting of n data elements and approximately $n^2/2$ conditions to be satisfied is encountered, a least squares approximation requires order $n^3$ operations. For larger values of n this is a highly computation intensive process which requires a mainframe computer to process the data.

SUMMARY OF THE INVENTION

The invention, as claimed, is intended to provide a solution to the problem of how to provide an efficient and expedient search of an existing database in order to reveal underlying patterns and/or obscure, latent relationships among individual data elements. The present invention, which can be implemented to solve real world problems on an ordinary personal computer, enables the user to visualize extremely large quantities of data in such a manner that secondary and tertiary relationships among the data elements can be readily identified. While methods currently available, such as link analysis, attempt to accomplish the same result, these methods do not scale to large databases, and they are ineffective in attempting to solve problems of the magnitude described below.

The inventive method can be adapted to identify relationships present in many different types of databases. By way of appreciating the breadth of applications for this invention, it is noted that the same underlying techniques can be used to identify criminal activities and criminal organizations by analyzing databases consisting of records of telephone conversations, to identify files of interest for use by prosecutors and investigators involving computers seized by law enforcement agencies, to analyze chemical import and export data to identify illegal drug manufacturing, to analyze financial transactions to detect money laundering activities, to analyze Internet traffic to identify suspected criminal activity and terrorist groups, and to search extremely large databases, such as patent applications or law case books, to find records closely related to topics of research.

The above examples are only a few of the many potential applications for the inventive method.

The inventive method can be divided into four parts:
1. Defining a relationship between data elements.
2. Defining a metric and computing the "distance" between data elements.
3. Mapping the data elements into points in the x-y plane such that "distances" between data elements are preserved.
4. Identifying latent relationships among data elements by viewing the image of the points which have been mapped into the x-y plane.

Defining direct relationships among data elements is usually a straightforward procedure that can be accomplished from the data contained in the given database. For example, in criminal investigations using databases of telephone records, each record contains the telephone number of the caller and the callee. Two telephone numbers are directly related if they are involved in a communication. The strength or intensity of the relationship is determined by the number of communications—the more communications, the stronger the relationship.

In searching through files on seized computers, one can define two computer files as related by the number and type of words (character strings) they have in common. The strength of the relationship depends upon the nature of the common words.

Relationships between countries (or other entities) involved in commerce are defined in terms of whether two entities trade a given commodity. If such trade exists, then the strength of the relationship is determined by the dollar volume of trade.

The approach for analyzing financial transactions and internet traffic are similar to that of the telephone database. Searching extremely large databases, such as patent applications or law case books, is similar in concept to searching through a large number of files on a seized computer.

Defining the metric and computing the "distances" between data elements consists of implementing a formula which depends upon the relative strengths of the relationships. For example, in a telephone call database, telephone numbers are divided into disjoint clusters. Each telephone number in a cluster only comminicates with numbers from that cluster. If M is the maximum number of communications between two telephone numbers in a cluster, the distance between telephone numbers A and B in that cluster is $M/N_{AB}$ where $N_{AB}$ is the number of communications between A and B. If A and B do not communicate, the distance between them is not defined.

In defining the metric where the data elements are files on a computer (or in a database of patent applications or law case books) each word (or character string) is assigned a score. Words such as "the" are assigned an extremely low score, such as one point. Words dealing with specific subject matter, such as "pyrotechnic", will be scored much higher. The word list from each file is compared with the word list from every other file, and the respective scores are tallied. The closer the score between two files, the shorter the "distance" between the files. (In this illustration "words" refer to character strings and are not limited to words in the English language.)

The third part of the inventive method is to map the data elements into the x-y plane such that "distances" between data elements are preserved. This part is the most computationally intensive portion of the inventive method. If the number of data elements is n, then the number of "distances" between data elements is of order $n^2$. Thus, there are approximately $n^2/2$ conditions to be satisfied, however, there are only 2n degrees of freedom (n x-coordinates and n y-coordinates) available to satisfy those conditions. Since $n^2$ is typically much larger than 2n, this problem is highly over constrained, and in general, does not have an exact solution. The usual approach to solving such problems is to use a least squares approximation to obtain the "best" solution possible. In this approach, the sum of the squares of the "errors", at each point is minimized. Least squares problems of size n typically require order $n^3$ operations to solve the problem on a computer.

Because the inventive method is designed to solve problems involving large amounts of data, the number of data elements, n, would be extremely large. Computing least squares solutions for these problems would require powerful mainframe computers.

The inventive method contains an approximation to the least squares solution which is of order n. Consequently, the inventive method scales effectively, and problems involving large n can be solved on ordinary personal computers.

The approximation to the least squares solution maps data elements into points in the plane in a sequential manner. That is, one data element is mapped at a time. The key to the success of this method is the order in which the data elements are chosen for mapping. The "most important" points are mapped first, and the "least important" points are mapped last.

Details of the procedures used to determine the relative importance of each data element are contained below.

The fourth part of the inventive method consists of viewing the images of the data elements after they have been mapped into the x-y plane. The locations of the data points preserves the distances between the data elements. As a result, secondary and tertiary relationships among the data elements can be observed and readily identified by the user. Relevant information about the data elements can be accessed while viewing the plotted points to aid in the analysis. Additional tools are available to the user to further aid in identifying latent relationships among data elements.

BRIEF DESCRIPTION OF THE DRAWINGS

One way of carrying out the invention is described in detail below with reference to drawings which illustrate only one specific embodiment of the invention and in which:

FIG. 2 is a sample database used to illustrate the inventive method;

FIG. 3 is a list displaying the distinct numbers used in the sample database;

FIG. 4 is a temporary database created using the inventive method;

FIG. 5a is a list displaying a sort by numerical order of the sample database;

FIG. 5b is a list displaying a sort by frequency of the sample database;

FIG. 6 is a relationship matrix for the sample database;

FIG. 7 is an illustration of the disjoint clusters of the sample database;

FIG. 8 is a reordered relationship matrix for the sample database;

FIG. 9 is a distance matrix for the sample database;

DETAILED DESCRIPTION

Figure 1:
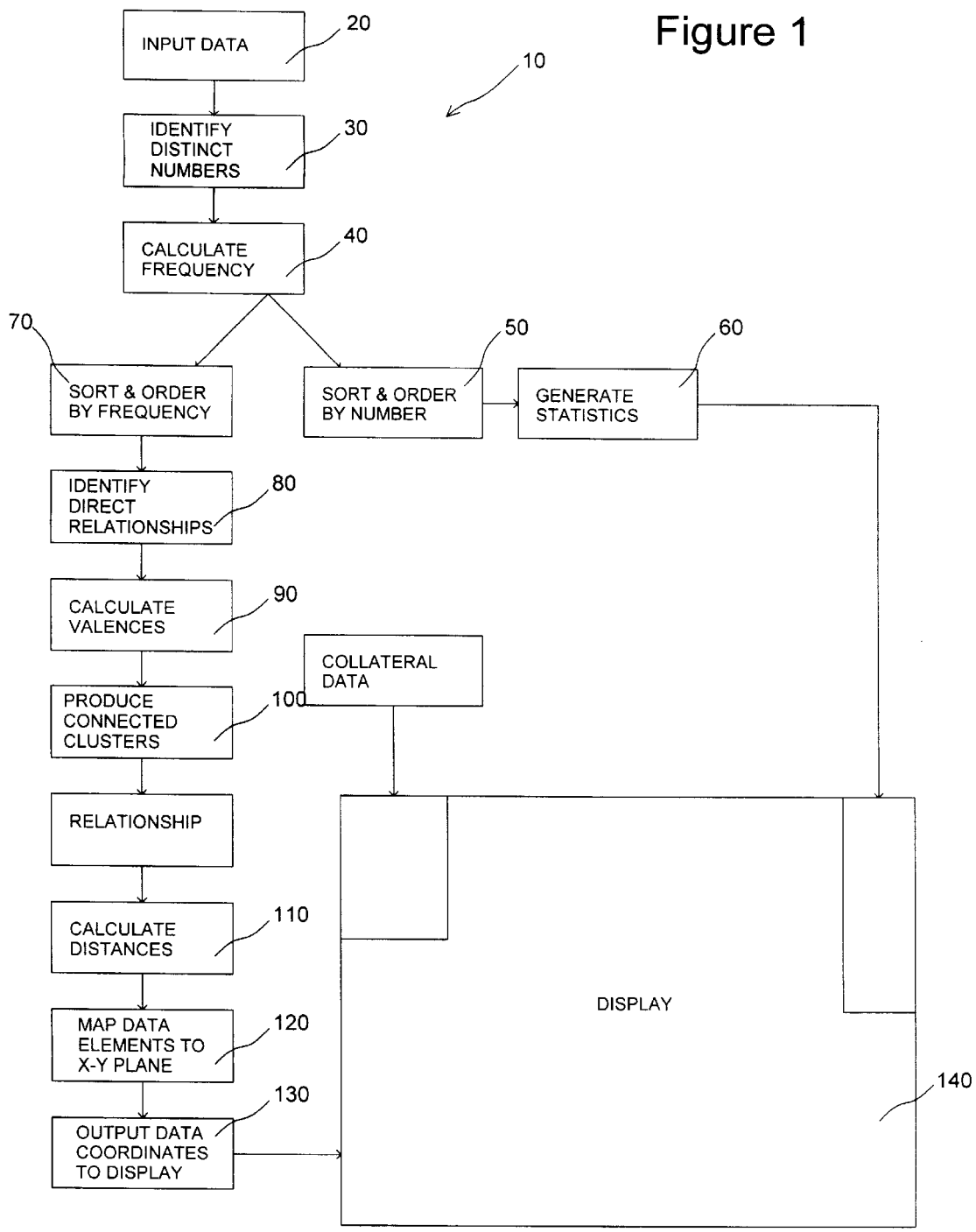
FIG. 1 is a diagram illustrating an embodiment of the inventive method.

Referring now to the drawings, the preferred embodiment of the present invention will be described. An example of the inventive method which illustrates the four parts of the method involves a database of telephone calls. Each record in the database consists of the caller's telephone number and the receiving party or callee's telephone number. The goal is to identify direct and indirect relationships among the data elements, which in this case, are the distinct telephone numbers in the database. Two data elements are directly related if there is a telephone call in the database between them. No distinction is made between the caller and the callee.

A flowchart 10 describing the inventive method is illustrated in FIG. 1. The first step 20 involves inputting the data into the system. In accordance with the preferred embodiment of the present invention, a set of data 22 consists of telephone numbers. The telephone numbers are input in pairs where the first number is the caller in a particular call and the second number is the callee or person called in that particular call. The first and second numbers form a data pair. A sample database 24 is shown in FIG. 2. In order to explain the steps of the present invention a small exemplary database has been shown depicting only twenty pairs of numbers. However in practice such a database to be analyzed could consist of well over one million pairs of data.

The second step 30, in FIG. 1, is to identify the distinct telephone numbers in the database of telephone calls. The distinct telephone numbers are the data elements to be analyzed. In the present example there are nine distinct numbers, as shown in FIG. 3. At this stage of the process the data can be renamed for purposes of manipulation with efficiency. This is particularly useful if the data being processed is complex in nature, such as words, phrases, sales, or even paragraphs of information.

The third step 40, is to compute the total number of communications involving each telephone number. This number is called the frequency. The calculation of the frequency of each distinct telephone number can be accomplished by many methods. In this example the data has been sorted into groups consisting of each distinct telephone number, where each telephone number appears in the group as many times as it was either the caller or callee. Once the numbers are sorted they can simply be counted in order to determine the frequency of each individual member.

To illustrate the method, a database 24 consisting of twenty telephone calls is shown in FIG. 2. The nine distinct telephone numbers involved in the database, data elements 22 are shown in FIG. 3. These telephone numbers have been sorted in increasing numerical order.

The procedure used to calculate the frequency for each data element involves constructing a new, temporary database as shown in FIG. 4. Each time a telephone number is involved in a communication, it is listed in the new database; hence each telephone number may appear many times. The number of times a telephone number appears in this database is its frequency.

FIG. 4 depicts the present sample database once it has been sorted. The data 22 is shown separated into groups 42. Each individual piece of data 22 represents either a caller or a callee from database 24, which has been put into group 42 each time it appeared in database 24. Therefore in accordance with the present sample database telephone number 555-123-0001 appeared in the database a total of five times either as a caller or a callee.

Once the frequency has been calculated the data is further sorted in two ways. The data is sorted and placed in numerical order as shown in Step 50 of FIG. 1. Then the data has to be sorted and placed in numerical order, or in the case of a database consisting of words or phrases, placed in alphabetical order, and generic statistics can be generated regarding the data. These statistics can include the number of times each piece of data occurs in the database, the piece of data which occurs most frequently and any other statistic that may be deemed helpful to the user. The statistics can be displayed on a portion of the viewing screen in order to assist the user in identifying relationships. The generation of these statistics is represented by Step 60 of flow chart 10.

The temporary database for the example is shown in FIG. 4. Once the frequency has been computed, the data elements (and their frequencies) are sorted by numerical order and by frequency (highest frequency to lowest frequency) for later use, steps 50 and 70 in FIG. 1. For the sample database these results are shown in FIG. 5A and 5B.

Once the data has been sorted and ordered by frequency, relationships among the data must be identified. This process is performed at Step 80 in flow chart 10. Since the sample database deals with telephone calls, the relationship, whose intensity one wishes to measure, will be defined in terms of the number of communications between any two numbers. However, the relationship could also be the amount of time spent by the numbers in communication with to each other or any other relationship which the user wishes to test.

Phone numbers A and B are directly related if A communicates with B. The strength of a direct relationship between A and B depends upon the number of times A and B communicate.

For the sample data a relationship matrix has been constructed, as illustrated in FIG. 6, where each row and column in the matrix corresponds to a telephone number. The entry in the (i,j) position of the matrix is the number of times telephone number i communicates directly with telephone number j. Note that the matrix is symmetric and each entry on the diagonal is zero. Also, the frequency for a telephone number is the sum of the elements in the row or column that corresponds to that number.

After all of the direct relationships have been determined, the valence of each telephone number is computed. The valence for a telephone number is obtained from the relationship matrix by counting the number of non-zero entries in the row or column that corresponds to that telephone number. In the example, FIG. 6 also shows the valence for each telephone number. FIG. 7 actually identifies the list of telephone numbers that communicate with each telephone number.

The next step 100 in flowchart 10, is to decompose the data elements into disjoint clusters. This decomposition can be achieved by re-ordering the telephone numbers in the relationship matrix to obtain a block diagonal matrix. The numbers corresponding to the rows and columns of a diagonal block are the numbers in that cluster. Because the off-diagonal blocks are all zero, phone numbers in one cluster do not communicate (directly or indirectly) with any phone number in any other cluster. In the example, the relationship matrix with the rows and columns reordered is shown in FIG. 8. Note that the frequency and valence are preserved when the telephone numbers are permuted.

The next step 110 in flowchart 10, is to calculate distances between data elements in a cluster that are directly related to each other. This calculation is performed by constructing a distance matrix from the permuted relationship matrix. In a diagonal block let M be the largest entry for that block. Replace each non-zero entry in the block by M divided by the non-zero entry. Note that the larger the number of communications between two numbers, the smaller the distance between them. Replace each zero entry in the block by a large number. Note that the distance matrix is also block diagonal and symmetric. The distance matrix for the sample data set is shown in FIG. 9. In this case the large number corresponding to the zero entries in the block diagonal submatrices is 10.

Once the "distances" between elements in a cluster have been computed, the next step 120 in flowchart 10, is to map the telephone numbers into points in the x-y plane which preserves (as much as possible) the "distances" between telephone numbers. The mapping is done sequentially in that each point in a cluster is mapped one point at a time. The key to implementing this method is the order in which the points are selected for the mapping. The order is determined by the valence, the frequency, and the relationship of each unmapped data element to the data elements already mapped into the x-y plane.

The telephone number with the largest valence is mapped into the origin (the point (0,0) in the x-y plane). In the example two telephone numbers have a valence of 5, but 555-123-4000 (abbreviated by 4000) has a higher frequency, so it is the first data element mapped to the x-y plane. The second data element to be mapped is the data element with the smallest distance to the data element already mapped into the x-y plane. If more than one data element satisfies this condition, the one with the largest valence from this group is selected as the second data element to be mapped. This data element is mapped to the point (d,0) where d is that distance. In the example, the data element 0001 is mapped to (1,0).

The third number to be mapped is the telephone number with the strongest relationship to both previously mapped points. If two numbers are tied in this measure, the one with the highest valence is selected. This selection procedure is used until all points in the cluster have been mapped into the x-y plane. The mathematical procedures describing how the data elements are mapped are described in the next section. In the example, the remaining numbers are selected in order 8899, 0808, 0300, 5500, and 0200.

Once all of the data elements have been mapped to x-y coordinates on a plane, using the afore described approximation method, the display output can be analyzed by the user. This final step in the process allows the user to view plots of the points in the x-y plane which are the images of the telephone numbers in the database. These plots identify secondary and tertiary relationships among the data elements which are not accessible using methods currently in existence. The relationships among the data are represented by the distance between two specific pieces of data. The closer in distance that two pieces of data reside, the closer the relationship is between the two pieces of data.

In the present sample database containing telephone numbers, the specific coordinates for each piece of data will be output to a display. However, in the present sample database there are only a small number of individual pieces of data, therefore the sample database used for the display will be considerably larger.

Figure 10:
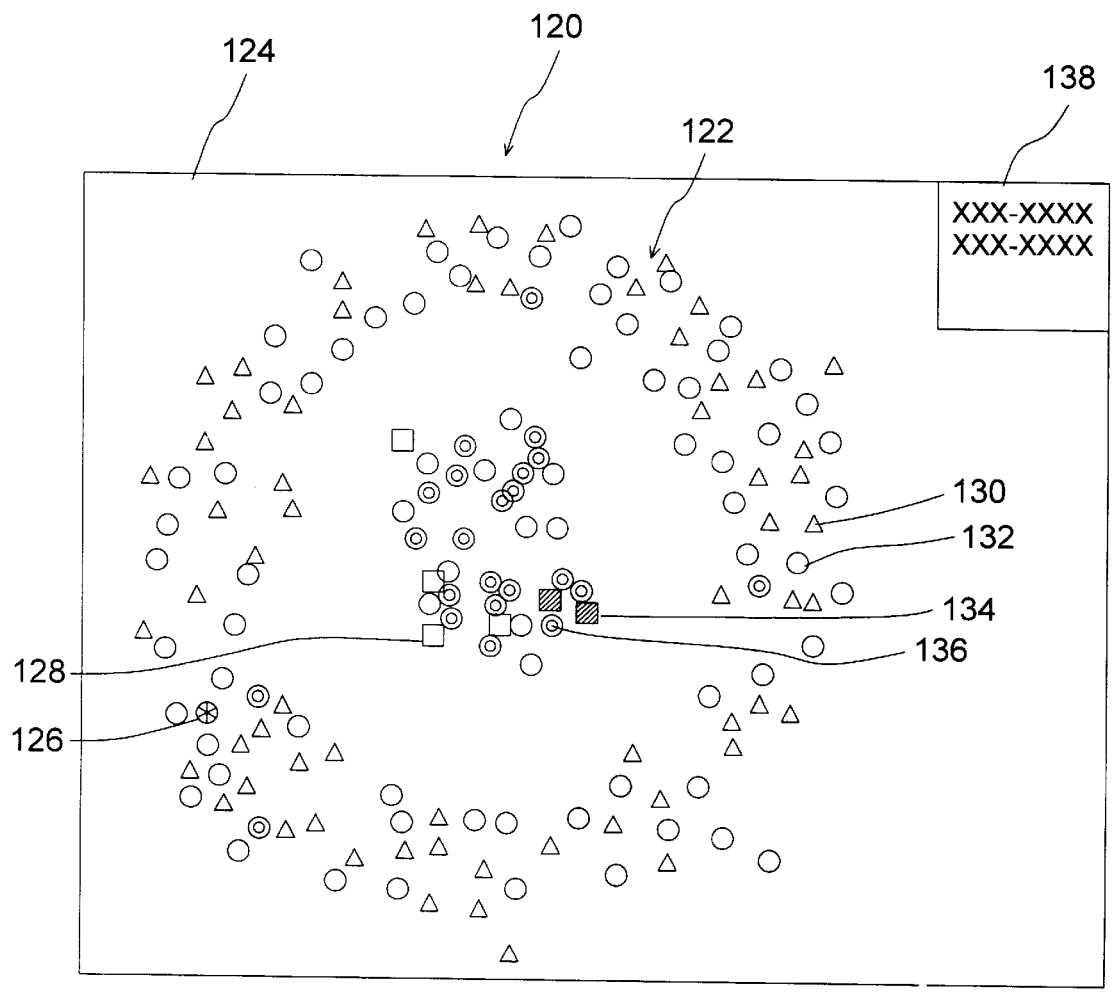
FIG. 10 is a display depicting a sample output mapping.

As can be seen in FIG. 10, step 120 in FIG. 1, the results of mapping hundreds of data elements 122 into the x-y plane is displayed on a screen 124. Screen 124 is preferably a computer display monitor which would be connected to a processing unit. Data elements 122 can be displayed in different colors, or as in this example different shapes which represent different relationships among the data. The display is generated by beginning with a piece of data which the user has identified as a number of interest. The initial number of interest is represented by a hexagon 126. Each number which has a direct communication with the initial number of interest is represented by a square 128. Each number which has a direct communication with a square 128, but not with the initial number of interest, is represented by a triangle 130. Each number which has a direct communication with a triangle 130, but not with the initial number of interest or a square 128, is represented by a circle 132. Changing the number of interest will change the shape of other numbers displayed on the screen, but not their location. In this example the telephone numbers are being examined to determine if there is any suspicious behavior exhibited by any individual. A law enforcement officer would examine the display to determine any patterns of communication between known or unknown criminals. In this example a person who is a known criminal, or currently under investigation is represented by a shaded square 134 or a double Circle 146 depending on their relationship to the number of interest.

By examining FIG. 10, it can be clearly seen that a number of "Suspicious" numbers communicate frequently with each other. This can be deduced by the proximity of an individual's position to the center of the display. Also the proximity of an individual's position in relation to another number represents the intensity of the relationship, whereby the closer the positioning the closer the relationship.

In FIG. 10, the center portion of the display is populated by a large percentage of "Suspicious" numbers. Therefore the numbers located within the central portion of the display, and also in the close proximity of a multiple of "Suspicious" numbers might warrant further investigation. This can be further explored by selecting a number targeted for further investigation as the number of interest and observing the changes in the relationship, among the data.

Figure 11:
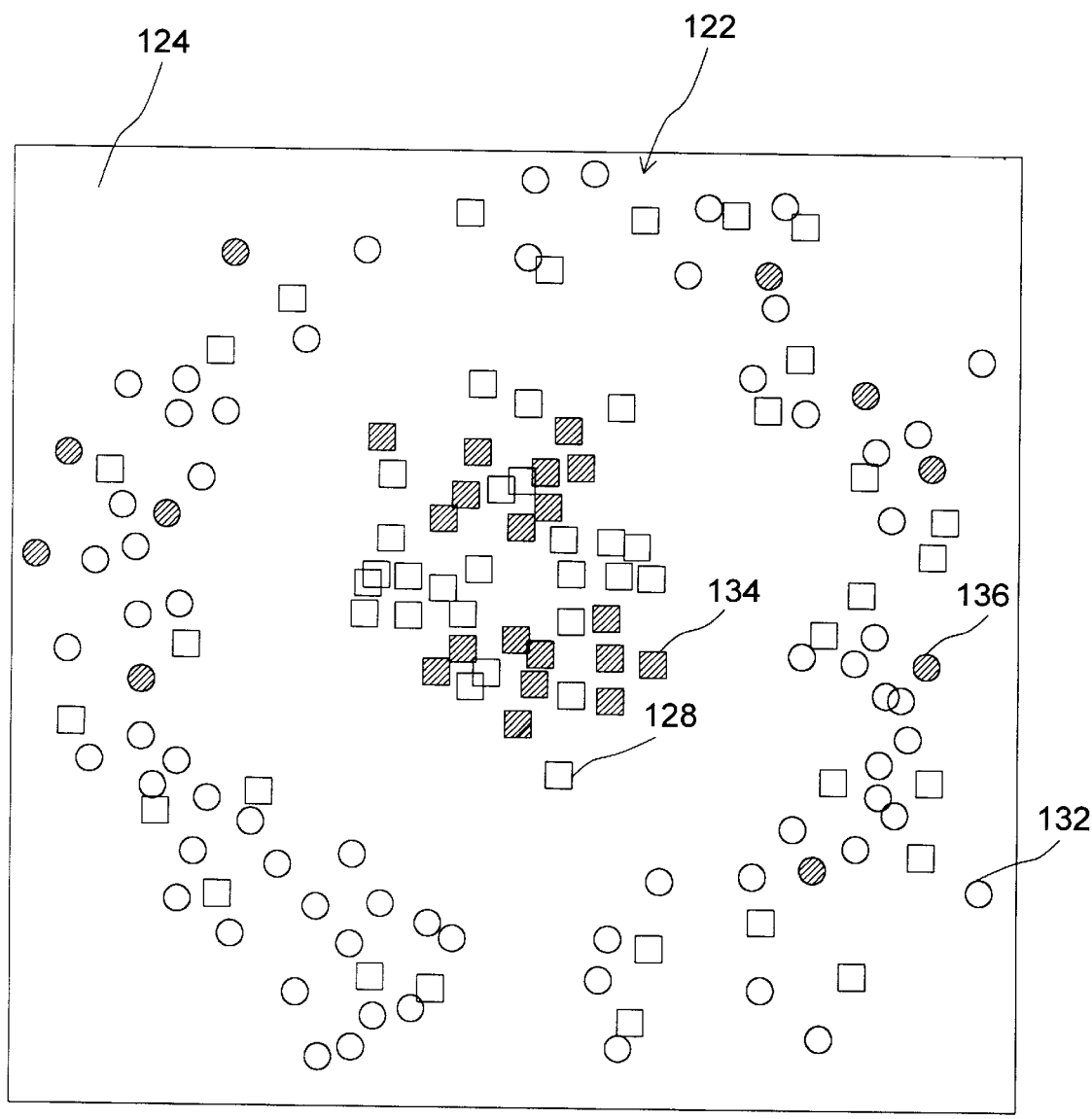
FIG. 11 is a display depicting a reorganized sample output mapping.

The changes in the relationships amongst the data points is shown in FIG. 11. As can be clearly seen, the numbers in the center of the display are all connected to the new point selected, and a large portion of the numbers are "Suspicious". This pattern may indicate to a law enforcement officer that a more detailed investigation of the numbers which communicate with the suspicious numbers is worthwhile. Further investigation is assisted by the additional information displayed in area 138 of display screen 124, and collateral data 140 can also be displayed by the user simply clicking the cursor on a piece of data which is targeted for investigation.

Collateral data 140 can consist of the name of the person associated with the telephone number, their address, or any other file data available. Additional information can be displayed in area 138. This addition information can consist of any generic statistic relating to the data, such as, the frequency each piece of data appears in the database, the number with the highest frequency in the database, the average frequency of a number in the database or any other statistical information that may be useful to the user.

Figure 13:
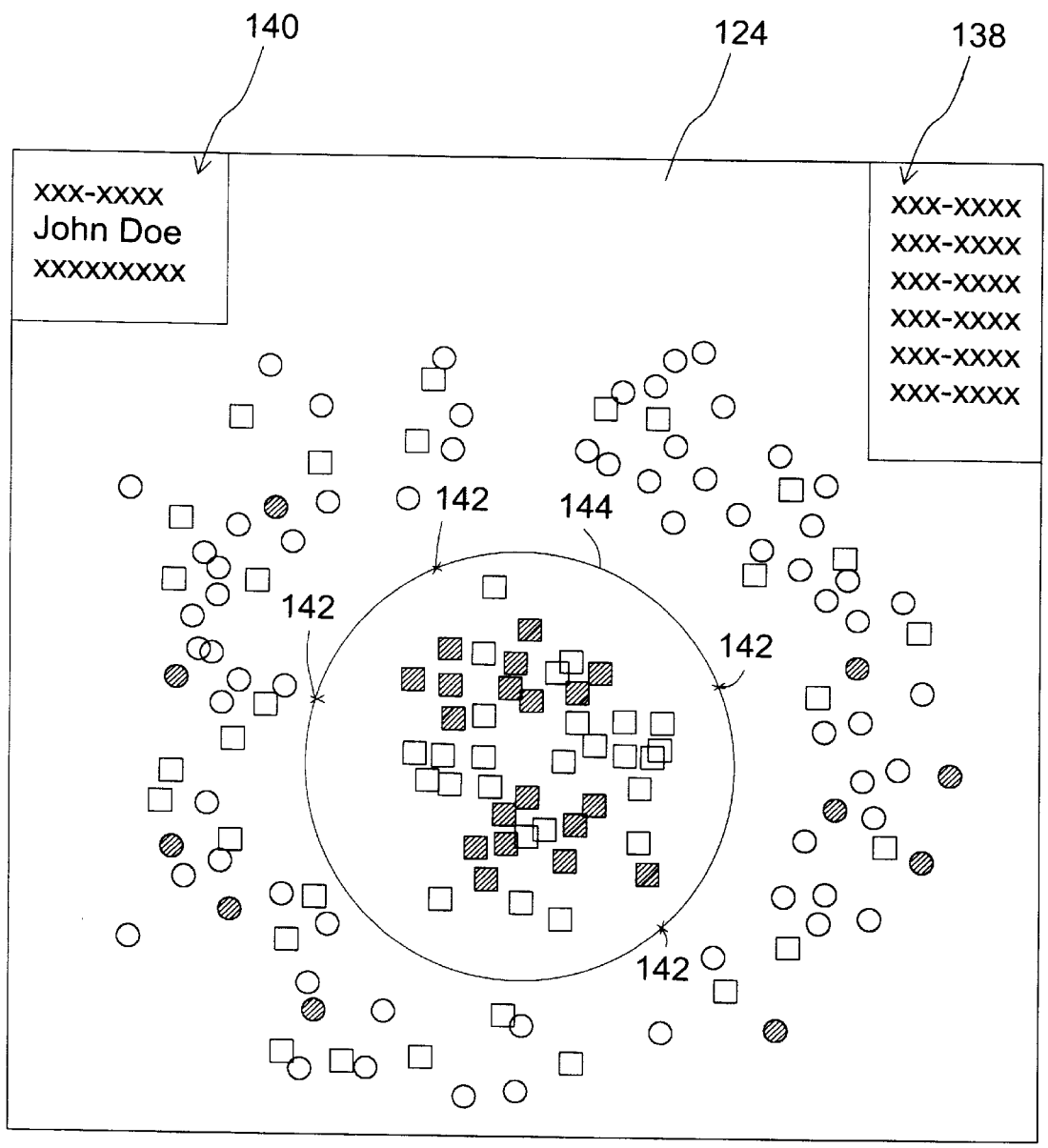
FIG. 13 is a display depicting a sample output mapping and collateral data showing a zone of interest.

Another useful feature of the present invention is illustrated in FIG. 13. Points 142 can be located around a Cluster of data. A zone of interest 144 will then be created so that points 142 are intercepted by zone 144. The zone of interest can then be examined in closer detail, by zooming in and magnifying the area within zone 144.

Figure 12:
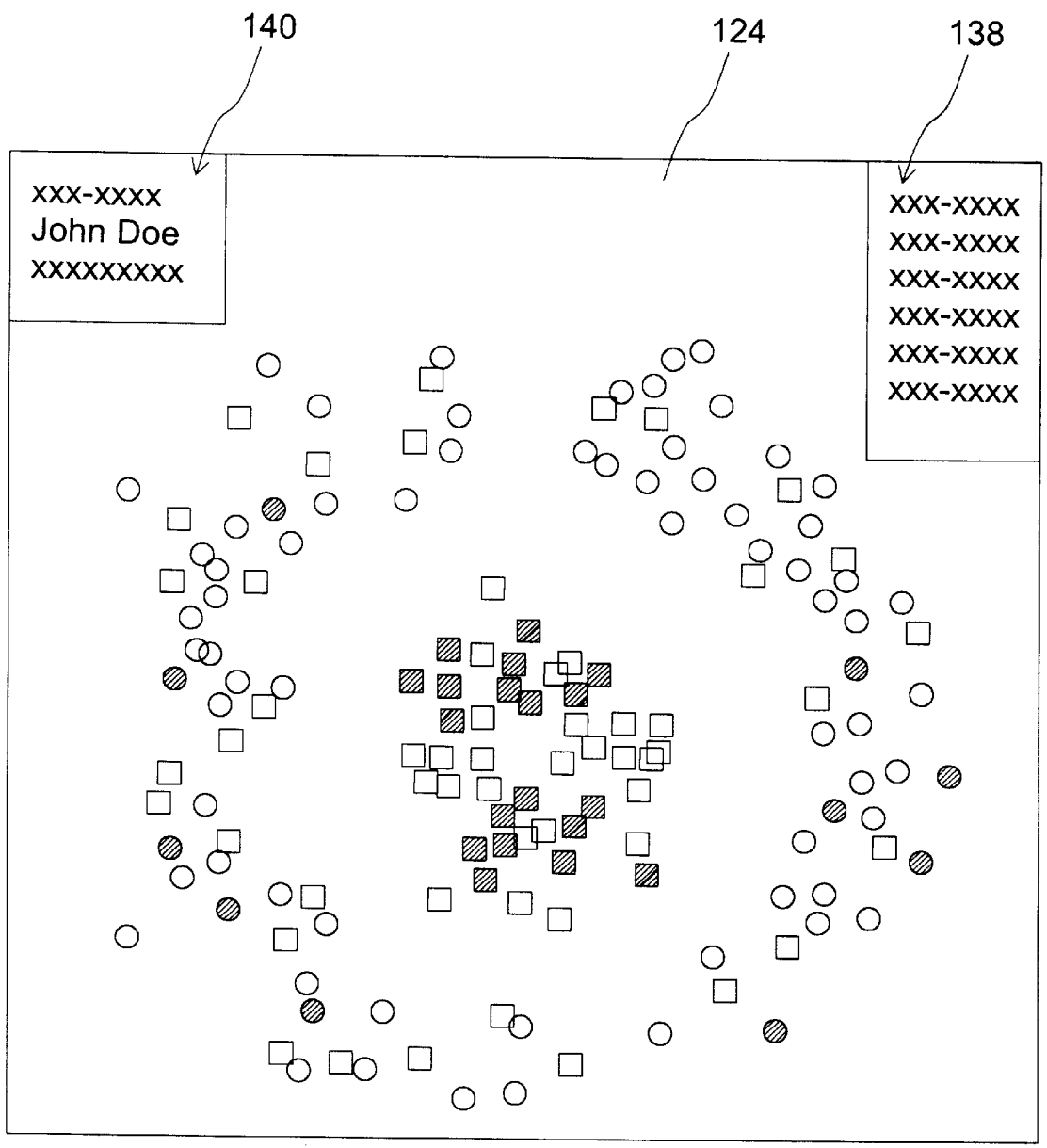
FIG. 12 is a display depicting a sample output mapping and collateral data.

In practice, each telephone number is actually represented by a small circle or square as shown in these Figures. A shaded image means the telephone number is associated with an existing record in an information database maintained by a law enforcement agency, such as a wire tap or a PEN register (a device used by law enforcement to record incoming and outgoing telephone calls). By using features of the plotting program, information about any telephone number is readily accessible on screen. One of the major uses of this implementation is the identification of high quality leads in criminal cases. In FIGS. 12 and 13 the suspected criminal organization is the group of telephone numbers associated with the cluster of points near the center of the Figures. The data used in this plot is consistent with over one million telephone calls involving over thousands of different telephone numbers.

Mathematics of Mapping Data Elements to the x-y Plane

Let $S=\{p_1, p_2, \ldots p_n\}$ be a set of n data elements to be mapped into the x-y plane, and let $D=\{d_{i,j}: i,j=1,2,\ldots n\}$ be a set of distances between the points. The object is to construct a mapping from S into the x-y plane which preserves the distances between the points as defined in D. That is, if data element $p_i$ is mapped into the point $(x_i, y_i)$ and if $p_j$ is mapped into the point $(x_j, y_j)$, then the distance between $(x_i, y_i)$ and $(x_j, y_j)$ is given by $$d_{i,j} = \sqrt{(x_i - x_j)^2 + (y_i - y_j)^2} \tag{A}$$

If each data element in S communicates directly with every other data element is S, then there are $n(n-1)/2$ nonlinear equations of the form (A). Since this set of equations does not, in general have a solution, the "best" solution is to minimize the sum of the squares of the "errors" at the n points. This sum is given by $$\sum_{i=1}^{n} \sum_{j>1}^{n} [(x_i - x_j)^2 + (y_i - y_j)^2 - d_{i,j}^2] \tag{B}$$

Minimizing this sum requires means selecting the "best" set of coordinates $\{(x_i, y_o): i=1,2,\ldots, n\}$. Classical methods for computing the least squares solution require order $n^3$ operations. For large values of n, this requires a large mainframe computer. The inventive method reduces the number of operations required to "solve" this problem from order $n^3$ to order n operations. This reduction is possible because the least squares solution is only approximated. The approximation is conceptually outlined by considering the following problem.

Let $\{(u_1,v^1), (u_2,v_2), \ldots, (u_k,v_k)\}$ be a set of k distinct points in the plane that are known. Let $\{d_1,d_2,\ldots, d_k\}$ be a set of k positive real numbers that define the distance from the (k+1)st point, (u,v) to the k points $(u_1,v_1), (u_2,v_2), \ldots, (u_k,v_k)$. Let $$H(u,v) = \frac{1}{4}\sum_{i=1}^{k}[(u-u_i)^2 + (v-v_i)^2 - d_i^2]^2$$

In order to solve the problem, values of u and v that minimize H(u,v) must be found. This minimum will be the (k+1)st point in the sequence. Before computing the minimum, define $u'=u-\mu_u$ and $v'=v-\mu_v$ where $$\mu_{uu} = \frac{1}{k}\sum_{j=1}^{k} u_j$$

and $$u' = u_i - \frac{1}{k}\sum_{j=1}^{k} u_j \text{ and } \sum_{i=1}^{k} u'_i = \sum_{i=1}^{k}\left[u_i - \frac{1}{k}\sum_{j=1}^{k} u_j\right] = \sum_{i=1}^{k} u_i - k\left[\frac{1}{k}\sum_{j=1}^{k} u_j\right] = 0$$

Then $$u_v = \frac{1}{k}\sum_{j=1}^{k} v_j.$$

Similarly, $$\sum_{j=1}^{k} v'_j = 0.$$

Also, $$u' - u'_i = (u-\mu_u) - (u_i-\mu_{ui}) = u - \frac{1}{k}\sum_{j=1}^{k} u_j - u_i + \frac{1}{k}\sum_{j=1}^{k} u_j = u - u_i$$

for all i. Similarly, $v'-v'_i=v-v_i$ for all i. Therefore, minimizing, $$H(u,v) = \frac{1}{4}\sum_{i=1}^{k}[(u-u_i)^2 + (v-v_i)^2 - d_i^2]^2 \quad (C)$$

is equivalent to minimizing, $$H(u',v') = \frac{1}{4}\sum_{i=1}^{k}[(u'-u'_i)^2 + (v'-v'_i)^2 - d_i^2]^2$$

For any angle $\alpha$, define $x = (\cos\alpha)u' + (\sin\alpha)v'$ $y = (-\sin\alpha)u' + (\cos\alpha)v'$ Then $(x-x_i) = (\cos\alpha)[u'-u'_i] + (\sin\alpha)[v'-v'_i]$ $(y-y_i) = (-\sin\alpha)[u'-u'_i] + (\cos\alpha)[v'-v'_i]$ Because the above mapping is a conformal mapping, it follows that, $(x-x_i)^2+(y-y_i)^2=(u-u_i)^2+(v-v_i)^2$ for all i. Also, $$\sum_{i=1}^{k} x_i = \sum_{i=1}^{k}[(\cos\alpha)u'_i + (\sin\alpha)v'_i] = 0.$$

Similarly, $$\sum_{i=1}^{k} y_i = 0.$$

The angle $\alpha$ is chosen so that, $$\sum_{i=1}^{k} x_i y_i = 0.$$

$$\sum_{i=1}^{k} x_i y_i = (\cos\alpha)(\sin\alpha)\sum_{i=1}^{k}[v'^2_i - u'^2_i] + (\cos^2\alpha - \sin^2\alpha)\sum_{i=1}^{k} u'_i v'_i,$$

Setting $$\sum_{i=1}^{k} x_i y_i = 0,$$

yields, $$(\cos\alpha)(\sin\alpha)\sum_{i=1}^{k}[v'^2 - u'^2] + (\cos^2\alpha - \sin^2\alpha)\sum_{i=1}^{k} u'_i v'_i = -0.$$

For $\cos^2\alpha - \sin^2\alpha \neq 0$, $$\frac{(\sin\alpha)(\cos\alpha)}{\cos^2\alpha - \sin^2\alpha} = \frac{\sum_{i=1}^{k} u'_i v'_i}{\sum_{i=1}^{k}[u'^2 - v'^2]}$$

For $\cos\alpha \neq 0$, we divide the numerator and denominator by $\cos^2\alpha$ to obtain, $$\frac{\frac{\sin\alpha}{\cos\alpha}}{1 - \frac{\sin^2\alpha}{\cos^2\alpha}} = \frac{\tan\alpha}{1-\tan^2\alpha} = \frac{\tan 2\alpha}{2} = \frac{\sum_{i=1}^{k} u'_i v'_i}{\sum_{i=1}^{k}[u'^2 - v'^2]}.$$

Hence, $$\alpha = \frac{1}{2}\tan^{-1}\left[\frac{\sum u'_i v'_i}{\frac{1}{2}\sum[u'^2_i - v'^2_i]}\right]$$

Returning to the minimization of H(u',v'), since u and v are essentially transformations of x and y, the minimization of H(u,v), as shown in equation (C) is the equivalent of minimizing H(x,y). Therefore by squaring the quantity inside the brackets, of equation (C), yields $$H(x, y) = \frac{1}{4}\sum_{i=1}^{k} [(x^2 + y^2)^2 - 4(x^2 x_i + x^2 yy_i + xy^2 x_i + y^3 yi) +$$
$$2x^2(3x_i^2 + y_i^2 - d_i^2) + 2y^2(x_i^2 + 3y_i^2 - d_i^2) +$$
$$4x(-x_i^3 - x_i y_i^2 + x_i d_i^2) + 4y(-x_i^2 y_i - y_i^3 + y_i d_i^2) +$$
$$(x_i^4 + 2x_i^2 y_i^2 + y_i^4 - 2x_i^2 d_i^2 - 2y_i^2 d_i^2 + d_i^4)]$$
$$= \frac{k}{4}(x^2 + y^2)^2 + \frac{2x^2}{4}\sum_{i=1}^{k}(3x_i^2 + y_i^2 - d_i^2) +$$
$$\frac{2y^2}{4}\sum_{i=1}^{k}(x_i^2 + 3y_i^2 - d_i^2) + \frac{4x}{4}\sum_{i=1}^{k} x_i(-x_i^2 - y_i^2 + d_i^2) +$$
$$\frac{4y^2}{4}\sum_{i=1}^{k} y_i(-x_i^2 - y_i^2 + d_i^2) + \frac{1}{4}\sum_{i=1}^{k}(x_i^2 + y_i^2 - d_i^2)^2$$

since $$\sum_{i=1}^{k} x_i = \sum_{i=1}^{k} y_i = \sum_{i=1}^{k} x_i y_i = 0$$

Therefore, $$4G(x, y) = \frac{4H(x, y)}{k} = (x^2 + y^2)^2 + 2(Ax^2 + Cy^2) + 4(Bx + Dy) + K$$

Solving for A, B, C, D, and K gives the following five equations:

$$A = \frac{1}{k}\sum_{i=1}^{k}(3x_i^2 + y_i^2 - d_i^2) \quad (1)$$

$$B = \frac{-1}{k}\sum_{i=1}^{k} x_i(x_i^2 + y_i^2 - d_i^2) \quad (2)$$

$$C = \frac{1}{k}\sum_{i=1}^{k}(x_i^2 + 3y_i^2 - d_i^2) \quad (3)$$

$$D = \frac{-1}{k}\sum_{i=1}^{k} y_i(x_i^2 + y_i^2 - d_i^2) \quad (4)$$

$$K = \frac{1}{k}\sum_{i=1}^{k}(x_i^2 + y_i^2 - d_i^2)^2 \quad (5)$$

To minimize G(x,y), the partial derivative is taken with respect to x, and with respect to y and set to 0. This yields, $$\frac{\partial}{\partial x}G(x, y) = (x^2 + y^2 + A)x + B = 0,$$

and $$\frac{\partial}{\partial x}G(x, y) = (x^2 + y^2 + C)y + D = 0.$$

The solution is within one of eight possible cases:

| | | | |
|---|---|---|---|
| 1. | A = C | B = 0, | D = 0 |
| 2. | A = C | B = 0, | D ≠ 0 |
| 3. | A = C | B ≠ 0, | D = 0 |
| 4. | A = C | B ≠ 0, | D ≠ 0 |
| 5. | A ≠ C | B = 0, | D = 0 |
| 6. | A ≠ C | B = 0, | D ≠ 0 |
| 7. | A ≠ C | B ≠ 0, | D = 0 |
| 8. | A ≠ C | B ≠ 0, | D ≠ 0 |

Looking at each case separately:

For Case 1: A=C B=0 D=0;
It follows, $x(x^2+y^2+A)=0$ and $y(x^2+y^2+C)=0$. If $A\geq 0$, then the only solution is x=0 and y=0. If A<0, choose $x^2+y^2=-A$. One solution is y=0 and $x=\sqrt{-A}$.

For Case 2: A=C B=0 D≠0;
It follows, $x(x^2+y^2+A)=0$ and $y(x^2+y^2+C)+D=0$. The first equation is solved by x=0. The second equation then becomes $x^3+Cy+D=0$. This equation has three roots, at least one of which is real. The real root that minimizes $y^4+2Ay^2+4Dy$ is selected.

For Case 3: A=C B≠0 D=0;
It follows, $x(x^2+y^2+A)+B=0$ and $y(x^2+y^2+C)=0$. The second equation is solved by y=0. The first equation then becomes $x^3+Ax^2+B=0$. As in Case 2, this equation has at least one real root. The real root that minimizes $x^4+2Ax^2+4Bx$. is selected.

For Case 4: A=C B≠0 D≠0;
It follows, $x(x^2+y^2+A)+B=0$ and $y(x^2+y^2+C)+D=0$. Or $x(x^2+y^2+A)=-B$ and $y(x^2+y^2+A)=-D$. Dividing the second equation by the first gives $$\frac{y}{x} = \frac{D}{B} \text{ or } y = \frac{D}{B}x.$$

Substituting into the first equation gives $$x^3 + \frac{D^2}{B^2}x^3 + Ax + B = 0.$$

Multiplying both sides of the equation by $B^2$ yields, $B^2 x^3 + D^2 x^3 + AB^2 x + B^3 = 0$, or $(B^2+D^2)x^3 + AB^2 x + B^3 0$, so $$x^3 + \frac{AB^2}{(B^2 + D^2)}x + \frac{B^3}{(A^2 + B^2)} = 0.$$

For Case 5: A≠C B=0 D=0;
It follows, $x(x^2+y^2+A)=0$ and $y(x^2+y^2+C)=0$. So, x=y=0 is always a solution. If $A\geq 0$ and $C\geq 0$, then the only solution is x=0 and y=0. If $A\geq 0$ and C<0, then the only solution to the first equation is x=0. In this case $y(y^2+C)=0$, which has the solution y=0 or $y=\pm\sqrt{-C}$. If A<0 and $C\geq 0$, then the only solution to the second equation is y=0. In this case the first equation is $x(x^2+A)=0$, which has the solution x=0 or $x=\pm\sqrt{-A}$. If both A and C are negative, then $x^2+y^2=-C$ satisfies the second equation. The first equation then becomes $x(-C+A)=0$. Since A≠C, the only solution is x=0. Alternatively, $x^2+y^2=-A$ satisfies the first equation. In this case the second equation becomes $y(-A+C)=0$. The only solution to this equation is y=0. The appropriate solution that minimizes G(x,y) is chosen.

For Case 6: $A \neq C$ $B=0$ $D \neq 0$;

It follows, $x(x^2+y^2+A)=0$ and $y(x^2+y^2+C)+D=0$. If $A<0$, then the first equation is satisfied if $x^2+y^2=-A$. In this case the second equation becomes $y(-A+C)+D=0$, or $$y = \frac{-D}{(-A-C)} = \frac{D}{(C-A)}.$$

Therefore, $$x^2 + \frac{D^2}{(A-C)^2} = -A$$

or $$x^2 = -A - \frac{D^2}{(A-C)^2}.$$

This has a real solution if and only if $$-A - \frac{D^2}{(A-C)^2} \geq 0.$$

In this case, $$x = \sqrt{-A - \frac{D^2}{(A-C)^2}}.$$

If $$-A - \frac{D^2}{(A-C)^2} \leq 0,$$

set $y=0$ and $x=\sqrt{-\sqrt{A}}$. If $A \geq 0$, then the only solution to the first equation is $x=0$. In this case the second equation becomes $y^3+Cy+D=0$ which has at least one real root. The real root that minimizes $y^4+2Cy+4Dy$ is chosen.

For Case 7: $A \neq C$ $B \neq 0$ $D=0$;

It follows, $x(x^2+y^2+A)+B=0$ and $y(x^2+y^2+C)=0$. If $C<0$, then the second equation has the solution $x^2+y^2=-C$. The first equation then becomes, $x(-C+A)+B=0$, or $$x = \frac{B}{(C-A)} \text{ and } y^2 = -C - \frac{B^2}{(C-A)^2}.$$

This equation has a real solution if and only if $$-C - \frac{B^2}{(C-A)^2} \geq 0.$$

If $$-C - \frac{B^2}{(C-A)^2} < 0, \text{ set } y = 0.$$

If $C \geq 0$, then the only solution to the second equation is $y=0$, and the first equation becomes $x^3+Ax+b=0$. This equation has at least one real root. Choose the real root that minimizes $x^4+2Ax^2+4Bx$.

For Case 8: $A \neq C$ $B \neq 0$ $D \neq 0$

It follows, $x(x^2+y^2+A)+B=0$ and $y(x^2+y^2+C)+D=0$. Both $x$ and $y$ are not zero. Solving the first equation for $x^2+y^2$ gives $x^2+y^2=-B-Ax/x$. Solving this equation for $y$ yields $$y = \pm\sqrt{\frac{-x^3 - Ax - B}{x}}.$$

Substituting this result into the second equation yields $$\pm\sqrt{\frac{-x^3-Ax-B}{x}}\left[\frac{-B-Ax}{x}+C\right]+D=0,$$

or, $$\pm\sqrt{\frac{-x^3-Ax-B}{x}}\left[\frac{-B-Ax}{x}+C\right]=-D.$$

This yields $$\pm\sqrt{\frac{-x^3-Ax-B}{x}} = \frac{-Dx}{(C-A)-B} = \frac{Dx}{(A-C)+B}.$$

Squaring both sides yields, $$\frac{-x^3-Ax-B}{x} = \left[\frac{Dx}{(A-C)+B}\right]^2,$$

or, $$D^2x^3+x^3[(A-C)x+B]^2+Ax[(A-C)+B]^2+B[(A-C)+B]^2=0-$$

Multiplying out gives, $$(A-C)x^5+2B(A-C)x^4+(B^2+A(A-C)x^3+(B(A-C)^2+2AB(A-C))x^2+(AB^2+2B^2(A-C)x+B^3=0$$

This is a quintic polynomial with at least one real root, for which $$\frac{-x^3-Ax-B}{x} \geq 0 \text{ and, } y = \sqrt{\frac{-x^3-Ax-B}{x}}$$

and which minimizes, $$(x^2+y^2)^2+2(Ax^2+Cy^2)+4(Bx+Dy).$$

The above described eight cases will provide approximate solutions to the general equation (B), which solves the problem in a least squares sense. The above described process will solve for the important points first. The important points being the points that are the most connected. The solution process maps the data elements to the x-y plane one point at a time. Each new point is mapped to a point that approximates the location for the "best" location for that point.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. A method of analyzing, using a computer, an existing database of data items and associated information, said associated information comprising relationship information associated with its respective data item, said relationship information defining relationships among data contained within said database, comprising the steps of:

(a) selecting a particular aspect of relationship information;

(b) scanning the data items and their associated information to determine the existence of said selected aspect of relationship information;

(c) selecting an object data item from said data items;

(d) grouping a plurality of data items related to said object data item into a specific group, each of said related data items contained within said specific group having a defined relationship with at least one other related data item contained within said specific group, and each of said related data items contained within said specific group not having a defined relationship with any of said data items outside said specific group;

(e) identifying each data item contained within the same group as said object data item;

(f) defining mathematical relationships among said data items and tallying the magnitude associated with said selected aspect of relationship information for each data item with respect to every other data item in the database;

(g) mapping the object data item and the other data items identified as being contained within said same group as said object data item onto a Cartesian coordinate, to generate a map image; and (h) displaying said map image.

2. A method as in claim 1, wherein said mapping comprises the steps of:

(i) mapping a first data item to the origin of said Cartesian coordinates, said first data item being the data item with respect to which said selected aspect exists most frequently;

(ii) mapping a second data item to a location along the x-axis of said Cartesian coordinate at a distance inversely related to the magnitude of the relationship between said first data item and said second data item, said second data item being the data item with the highest magnitude with respect to the first data item; and (iii) mapping successive data items to a location, within said Cartesian coordinates, at a distance inversely related to the magnitude of the relationship between the data item currently being mapped and all previously mapped data items, and which substantially represents the relative distance between the data item currently being mapped and all previously mapped data items, said successive data items being selected based on the magnitude associated with said selected aspect of relationship information and the previously mapped data items.

3. A method of analyzing, using a computer, an existing database of data items and associated information, said associated information comprising relationship information associated with its respective data item, said relationship information defining relationships among data contained within said database, comprising the steps of:

(a) selecting a particular aspect of relationship information;

(b) scanning the data items and their associated information to determine the existence of said selected aspect of relationship information;

(c) selecting an object data item from said data items;

(d) grouping a plurality of data items related to said object data item into a specific group, each of said related data items contained within said specific group having a defined relationship with at least one other related data item contained within said specific group, and each of said related data items contained within said specific group not having a defined relationship with any of said data items outside said specific group;

(e) identifying each data item contained within the same group as said object data item;

(f) tallying the magnitude associated with said selected aspect of relationship information for each data item with respect to every other data item in the database;

(g) mapping the object data item and the other data items identified as being contained within said same group as said object data item onto a Cartesian coordinate, to generate a map image, wherein said mapping comprises the steps of:

(i) mapping a first data item to the origin of said Cartesian coordinates, said first data item being the data item with respect to which said selected aspect exists most frequently;

(ii) mapping a second data item to a location along the x-axis of said Cartesian coordinate at a distance inversely related to the magnitude of the relationship between said first data item and said second data item, said second data item being the data item with the highest magnitude with respect to the first data item; and (iii) mapping successive data items to a location, within said Cartesian coordinates, at a distance calculated by approximating a least squares solution to said location of said successive data items, said least squares approximation being based on the magnitude of the relationship between the data item currently being mapped and all previously mapped data items, said successive data items being selected based on the magnitude associated with said selected aspect of obtained in step (a), wherein x represents the position of said third data item along the x-axis of said Cartesian coordinates, and y represents the position of said third data item along the y-axis of said Cartesian coordinates.

4. A method as in claim 3, wherein the positions of said successive data items are calculated by:

(a) solving a set of equations for constants, said constants being represented by A, B, C, and D, said set of equations using the plotted points $(x_i, y_i)$ through $(x_k, y_k)$ for i=1, comprising:

$$A = \frac{1}{k}\sum_{i=1}^{k}(3x_i^2 + y_i^2 - d_i^2) \quad \text{(i)}$$

$$B = \frac{-1}{k}\sum_{i=1}^{k}x_i(x_i^2 + y_i^2 - d_i^2) \quad \text{(ii)}$$

$$C = \frac{1}{k}\sum_{i=1}^{k}(x_i^2 + 3y_i^2 - d_i^2) \quad \text{(iii)}$$

$$D = \frac{-1}{k}\sum_{i=1}^{k}y_i(x_i^2 + y_i^2 - d_i^2) \quad \text{(iv)}$$

wherein k represents the number of previously plotted data items, $x_i$ represents the x-axis Cartesian coordinates of the corresponding data item numbered i, $y_i$ represents the y-axis Cartesian coordinates of the corresponding data item numbered i, and d represents the relative distance between said data items;

(b) solving $x(x^2+y^2+A)+B=0$ and $y(x^2+y^2+C)+D=0$, using said constants item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

5. A method as in claim 3, wherein the positions of said successive data items are calculated by:
   (a) solving a set of equations for constants, said constants being represented by A, B, C, D, and K, said set of equations using the plotted points $(x_i, y_i)$ through $(x_k, y_k)$ for i=1, comprising:

$$A = \frac{1}{k}\sum_{i=1}^{k}(3x_i^2 + y_i^2 - d_i^2) \quad \text{(i)}$$

$$B = \frac{-1}{k}\sum_{i=1}^{k}x_i(x_i^2 + y_i^2 - d_i^2) \quad \text{(ii)}$$

$$C = \frac{1}{k}\sum_{i=1}^{k}(x_i^2 + 3y_i^2 - d_i^2) \quad \text{(iii)}$$

$$D = \frac{-1}{k}\sum_{i=1}^{k}y_i(x_i^2 + y_i^2 - d_i^2) \quad \text{(iv)}$$

$$K = \frac{1}{k}\sum_{i=1}^{k}(x_i^2 + y_i^2 - d_i^2)^2 \quad \text{(v)}$$

wherein k represents the number of previously plotted data items, $x_i$ represents the x-axis Cartesian coordinates of the corresponding data item numbered i, $y_i$ represents the y-axis Cartesian coordinates of the corresponding data item numbered i, and d represents the relative distance between said data items;
   (b) solving $x(x^2+y^2+A)+B=0$ and $y(x^2+y^2+C)+D=0$, using said constants obtained in step (a), wherein x represents the position of said third data item along the x-axis of said Cartesian coordinates, and y represents the position of said third data item along the y-axis of said Cartesian coordinates.

6. A method as in claim 3, wherein said map image is displayed with said object data item being represented on the display by a first visual representation, second order data items having said selected aspect in common with said object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

7. A method as in claim 3, wherein a different object data item can be selected from said mapped data items, said selection of a different object data item generating a new map image wherein said new map image is displayed with said different object data item being represented on the display by a first visual representation, second order data items having said selected aspect in common with said different object data relationship information and the previously mapped data items; and (h) displaying said map image.

8. A method as in claim 3, wherein each of said related data items contained within said specific group having a defined relationship with a plurality of other related data item contained within said specific group.

9. A method as in claim 3, wherein said particular aspect of relationship information is the placing or receiving of a telephone call to or from a selected number.

10. A method as in claim 4, wherein said map image is displayed with said object data item being represented on the display by a first visual representation, second order data items having said selected aspect in common with said object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

11. A method as in claim 10, wherein a different object data item can be selected from said mapped data items, said selection of a different object data item generating a new map image wherein said new map image is displayed with said different object data item being represented on the display by a first visual representation, second order data items having said selected aspect in common with said different object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

12. A method as in claim 11, wherein each of said related data items contained within said specific group has a defined relationship with a plurality of other related data item contained within said specific group.

13. A method as in claim 12, wherein said particular aspect of relationship information is the placing or receiving of a telephone call to or from a selected number.

14. A method as in claim 3, wherein said map image is displayed with said object data item being represented on the display by a first visual representation, second order data items having said selected aspect in common with said object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

15. A method as in claim 14, wherein a different object data item can be selected from said mapped data items, said selection of a different object data item generating a new map image wherein said new map image is displayed with said different object data item being represented on the display by a first visual representation, second order data items having said selected aspect in common with said different object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

16. A method as in claim 3, wherein said particular aspect of relationship information is the placing or receiving of a telephone call to or from a selected number.

17. A method as in claim 4, wherein said particular aspect of relationship information is the placing or receiving of a telephone call to or from a selected number.

18. A method of analyzing, using a computer, an existing database of data files, said data files containing data items, comprising the steps of:
   (a) selecting a particular data file;
   (b) assigning a numerical value to each data item contained within said selected data file;
   (c) comparing the data items of said selected data file to the data items contained within the other data files contained within said database;
   (d) for each data item contained within said selected data file that matches a data item contained within said other data file, registering the numerical value assigned to said data item;
   (e) defining a mathematical relationship among said data items and tallying the respective numerical values associated with said other data files;
   (f) mapping the data files one at a time onto a Cartesian coordinate to generate a map image; and
   (g) displaying said map image.

19. A method as in claim 18, wherein said mapping comprises the steps of:
   (a) mapping a first data file to the origin of said Cartesian coordinates, said first data file being the data file with the highest tally;
   (b) mapping a second data file to a location along the x-axis of said Cartesian coordinate at a distance inversely related to the tally between said first data file and said second data file, said second data file being the data file with the highest tally with respect to the first data file; and
   (c) mapping successive data files to a location, within said Cartesian coordinates, at a distance inversely related to the tally of the relationship between the data file currently being mapped and all previously mapped data files, and which substantially represents the relative distance between the data file currently being mapped and all previously mapped data files, said successive data files being selected based on the tally associated with said previously mapped data files.

20. A method of analyzing, using a computer, an existing database of data items and associated information, said associated information comprising relationship information associated with its respective data item, said relationship information defining relationships among data contained within said database, comprising the steps of:
   (a) selecting a particular aspect of relationship information, wherein said specific aspect is the placing or receiving of a telephone call to or from a selected number;
   (b) scanning the data items and their associated information to determine the existence of said selected aspect of relationship information;
   (c) selecting an object data item from said data items;
   (d) grouping a plurality of data items related to said object data item into a specific group, each of said related data items contained within said specific group having a defined relationship with at least one other related data item contained within said specific group, and each of said related data items contained within said specific group not having a defined relationship with any of said data items outside said specific group;
   (e) identifying each data item contained within the same group as said object data item;
   (f) tallying the magnitude associated with said selected aspect of relationship information for each data item with respect to every other data item in the database;
   (g) mapping the object data item and the other data items identified as being contained within said same group as said object data item onto a Cartesian coordinate, said mapping comprises the steps of:
      (i) mapping a first data item to the origin of said Cartesian coordinates, said first data item being the data item with respect to which said selected aspect exists most frequently;
      (ii) mapping a second data item to a location along the x-axis of said Cartesian coordinate at a distance inversely related to the magnitude of the relationship between said first data item and said second data item, said second data item being the data item with the highest magnitude with respect to the first data item; and
      (iii) mapping successive data items to a location, within said Cartesian coordinates, at a distance inversely related to the magnitude of the relationship between the data item currently being mapped and all previously mapped data items, and which substantially represents the relative distance between the data item currently being mapped and all previously mapped data items, said successive data items being selected based on the magnitude associated with said selected aspect of relationship information and the previously mapped data items, to generate a map image; and
   (h) displaying said map image, with said object data item being represented on the display by a first visual representation, second order data items having said selected aspect in common with said object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

21. A method as in claim 20, wherein a different object data item can be selected from said mapped data items, said selection of a different object data item generating a new map image wherein said new map image is displayed with said different object data item being represented on the display by a first visual representation, second order data items having said selected aspect in common with said different object data item being represented on said display by a second visual representation, third order data items having said selected aspect in common with said second order data items being represented by a third visual representation, subsequent order data items having said selected aspect in common with the immediate preceding order data items but not with prior preceding data items being represented by subsequent visual representations.

22. A method as in claim 20, wherein the positions of said successive data items are calculated by approximating a least squares solution to said position of said successive data items, said least squares approximation being based on the magnitude of the relationship between the data item currently being mapped and all previously mapped data items.

23. A method as in claim 20, wherein the positions of said successive data items are calculated by:
(a) solving a set of equations for constants, said constants being represented by A, B, C, and D, said set of equations using the plotted points $(x_i, y_i)$ through $(x_k, y_k)$ for i=1, comprising:

$$A = \frac{1}{k}\sum_{i=1}^{k}(3x_i^2 + y_i^2 - d_i^2) \quad \text{(i)}$$

$$B = \frac{-1}{k}\sum_{i=1}^{k}x_i(x_i^2 + y_i^2 - d_i^2) \quad \text{(ii)}$$

$$C = \frac{1}{k}\sum_{i=1}^{k}(x_i^2 + 3y_i^2 - d_i^2) \quad \text{(iii)}$$

$$D = \frac{-1}{k}\sum_{i=1}^{k}y_i(x_i^2 + y_i^2 - d_i^2) \quad \text{(iv)}$$

wherein k represents the number of previously plotted data items, $x_i$ represents the x-axis Cartesian coordinates of the corresponding data item numbered i, $y_i$ represents the y-axis Cartesian coordinates of the corresponding data item numbered i, and d represents the relative distance between said data items;
(b) solving $x(x^2+y^2+A)+B=0$ and $y(x^2+y^2+C)+D=0$, using said constants obtained in step (a), wherein x represents the position of said third data item along the x-axis of said Cartesian coordinates, and y represents the position of said third data item along the y-axis of said Cartesian coordinates.

24. A method of analyzing, using a computer, an existing database of data items and associated information, said associated information comprising relationship information associated with its respective data item, said relationship information defining relationships among data contained within said database, comprising the steps of:
(a) defining mathematical relationships among the data items;
(b) grouping said data items into specific groups in a manner such that each of said specific groups comprises data items having a defined relationship with at least one other related data item in each of said specific groups, said related data items contained within said specific group having no defined relationship with any of said data items in any other of said specific groups;
(c) selecting an object data item from said data items;
(d) identifying the specific group of data items containing said object data item;
(f) tallying the magnitude of the relationships among the data items in said the specific group of data items containing said object data item;
(g) mapping the object data item and the other data items identified as being contained within said specific group of data items containing said object data item onto a Cartesian coordinate, to generate a map image; and
(h) displaying said map image.

* * * * *